(12) United States Patent
Field et al.

(10) Patent No.: US 11,493,523 B2
(45) Date of Patent: Nov. 8, 2022

(54) AUTOMATED SYSTEM FOR SAFE SAMPLE COLLECTION, TRANSFER, AND ANALYSIS

(71) Applicant: Elemental Scientific, Inc., Omaha, NE (US)

(72) Inventors: Michael P. Field, Papillion, NE (US); Kevin Hahn, Urbandale, IA (US)

(73) Assignee: Elemental Scientific, Inc., Omaha, NE (US)

( * ) Notice: Subject to any disclaimer, the term of this patent is extended or adjusted under 35 U.S.C. 154(b) by 196 days.

(21) Appl. No.: 16/944,465

(22) Filed: Jul. 31, 2020

(65) Prior Publication Data

US 2021/0033631 A1 Feb. 4, 2021

Related U.S. Application Data

(60) Provisional application No. 62/883,613, filed on Aug. 6, 2019, provisional application No. 62/880,951, filed on Jul. 31, 2019.

(51) Int. Cl.
*G01N 1/10* (2006.01)
*G01N 35/00* (2006.01)
*G01N 35/10* (2006.01)

(52) U.S. Cl.
CPC ......... *G01N 35/00732* (2013.01); *G01N 1/10* (2013.01); *G01N 35/1004* (2013.01); *G01N 2035/00742* (2013.01)

(58) Field of Classification Search
CPC ......... G01N 35/00732; G01N 35/1004; G01N 1/10; G01N 2035/00742; G01N 2001/1031; G01N 30/88; G01N 35/10
USPC ......... 73/864.73, 61.55, 61.56, 61.59, 64.56, 73/863, 863.01, 863.72, 863.73, 864.83; 141/10, 102.1; 422/62, 63, 81, 82
See application file for complete search history.

(56) References Cited

FOREIGN PATENT DOCUMENTS

| JP | 2019100875 | * | 6/2019 |
| WO | 2014032285 | * | 3/2014 |

* cited by examiner

*Primary Examiner* — Robert R Raevis
(74) *Attorney, Agent, or Firm* — Kevin E. West; Advent, LLP

(57) ABSTRACT

Systems and methods for safe collection and transportation of fluid samples for analysis are described to avoid exposure of hazardous materials to personnel during collection and transfer of samples to laboratory processing equipment. A system embodiment includes, but is not limited to, a sample module including an enclosure configured to separate a sample from an external environment; a filling station defining a compartment into which the sample module can be received, the filling station configured to direct a fluid sample into the sample module and to rinse fluid connections between the filling station and the sample module prior to decoupling of the sample module from the filling station; and a sample transfer station configured to receive the sample module and to transfer sample from the sample module and direct the sample into a sample container.

20 Claims, 17 Drawing Sheets

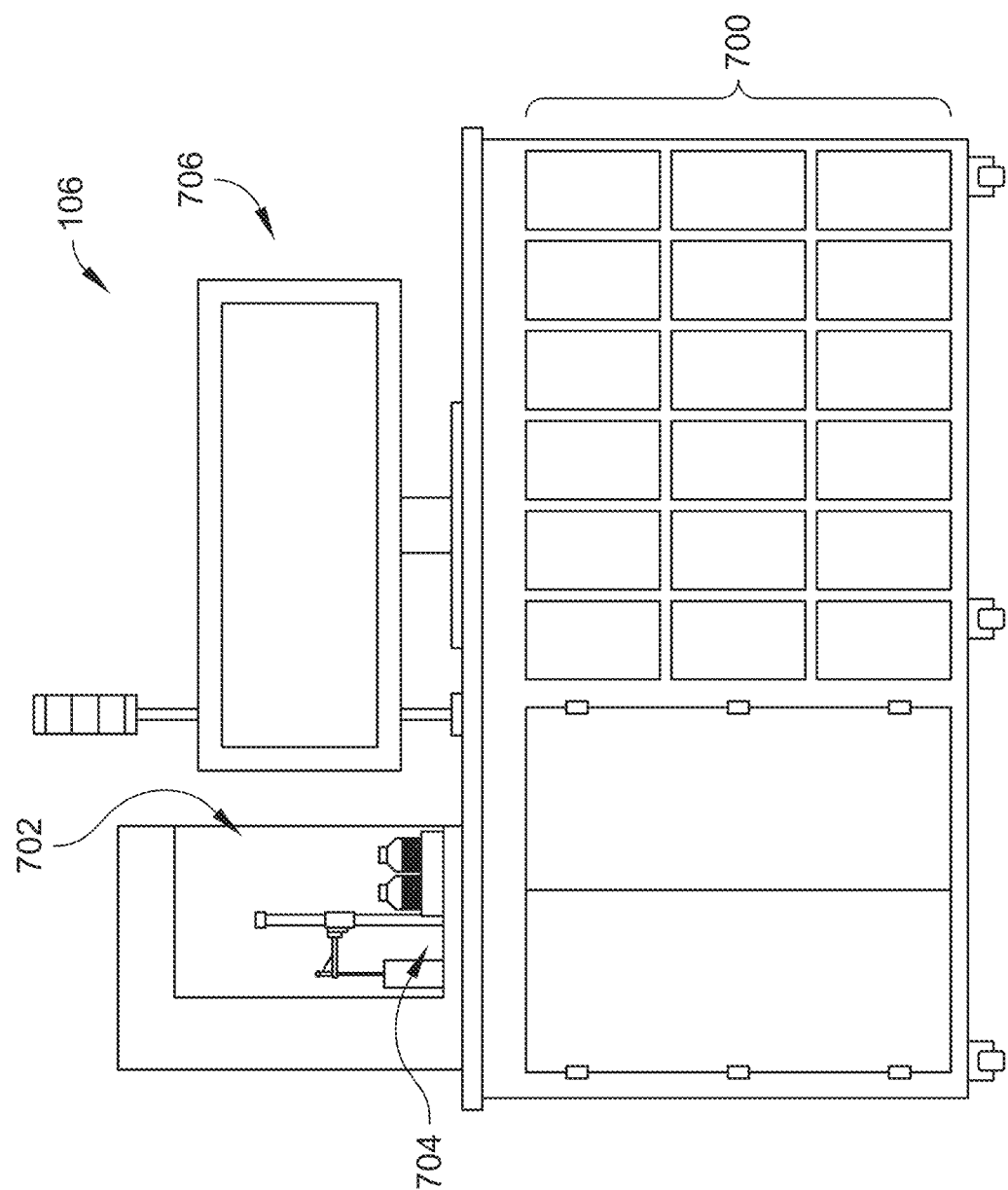

AUTOMATED SYSTEM FOR SAFE SAMPLE COLLECTION, TRANSFER, AND ANALYSIS

CROSS-REFERENCE TO RELATED APPLICATIONS

The present application claims the benefit of 35 U.S.C. §119(e) of U.S. Provisional Application Ser. No. 62/880,951, filed Jul. 31, 2019, and titled "AUTOMATED SYSTEM FOR SAFE SAMPLE COLLECTION, TRANSFER, AND ANALYSIS" and of U.S. Provisional Application Ser. No. 62/883,613, filed Aug. 6, 2019, and titled "AUTOMATED SYSTEM FOR SAFE SAMPLE COLLECTION, TRANSFER, AND ANALYSIS." U.S. Provisional Application Ser. Nos. 62/880,951 and 62/883,613 are herein incorporated by reference in their entireties.

BACKGROUND

In many laboratory settings, it is often necessary to analyze a large number of chemical or biochemical samples at one time. In order to streamline such processes, the manipulation of samples has been mechanized. Such mechanized sampling is commonly referred to as autosampling and is performed using an automated sampling device or autosampler.

Sample introduction systems may be employed to introduce liquid samples into ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Systems and methods for safe collection and transportation of fluid samples for analysis are described having automated sample filling stations and contained portable sample modules to avoid exposure of hazardous materials to personnel during collection and transfer of samples to laboratory processing equipment. A system embodiment includes, but is not limited to, a sample module including an enclosure configured to separate a sample from an external environment; a filling station defining a compartment into which the sample module can be received, the filling station configured to direct a fluid sample into the sample module and to rinse fluid connections between the filling station and the sample module prior to decoupling of the sample module from the filling station; and a sample transfer station configured to receive the sample module and to transfer sample from the sample module and direct the sample into a sample container.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

FIGURES

The Detailed Description is described with reference to the accompanying figures. The use of the same reference numbers in different instances in the description and the figures may indicate similar or identical items.

FIG. 7 is an isometric view of a sample transfer station of the system of FIG. 1.

DETAILED DESCRIPTION

Overview

Figure 1:
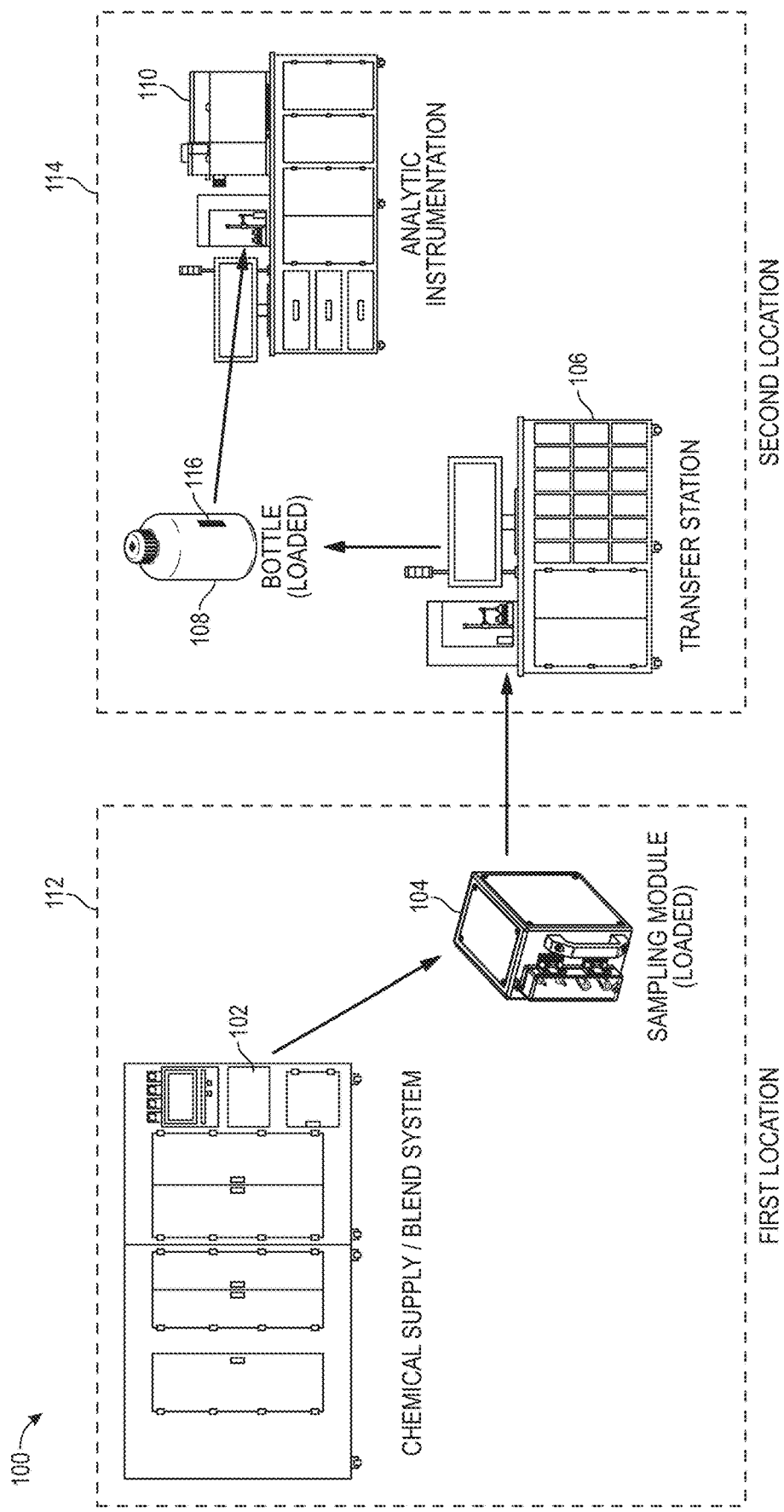
FIG. 1 is a schematic diagram of a system for automated, safe sample collection and transfer in accordance with example implementations of the present disclosure.

Often in laboratory or industry settings, large numbers of samples are analyzed. Autosamplers are frequently used to gather and introduce samples for subsequent testing of the composition of these samples. Using an autosampler typically allows more samples and other solutions to be prepared and tested as compared to manual preparation methods. Determination of trace elemental concentrations or amounts in a sample can provide an indication of purity of the sample, or an acceptability of the sample for use as a reagent, reactive component, or the like. For instance, in certain production or manufacturing processes (e.g., mining, metallurgy, semiconductor fabrication, pharmaceutical processing, etc.), the tolerances for impurities can be very strict, for example, on the order of fractions of parts per billion. For example, semiconductor processes can require ultralow detection limits for impurities in process chemicals including, but not limited to, ultrapure water (UPW) for washing wafers, isopropyl alcohol (IPA) for drying wafers, hydrogen peroxide ($H_2O_2$), ammonia solution ($NH_4OH$), acids and other etching chemicals, and the like. Failure to detect ultralow concentrations of impurities in such process chemicals can ruin a semiconductor wafer, such as by precipitating such impurities out of solution and onto the wafer (e.g., depositing a metallic impurity or other conductivity hazard onto the wafer, such as through precipitation of the impurity out of solution, the wafer acting as a concentrator surface for the impurity, or the like).

Processes for gathering samples for analysis can vary depending on the type of sample, the location of a sample, the location of testing equipment, personnel involved, and the like. Oftentimes individuals (e.g., factory or laboratory technicians or other personnel) are trained to gather a sample into a sample vessel, such as a test tube or bottle, and transport the sample to a laboratory or other location for analysis. For many locations (e.g., factories, fabrication facilities, chemical plants, etc.), the source of a sample may be located relatively far away from analytic instrumentation used to test the sample. For example, a chemical supply line in a factory may be positioned in a separate area of the factory from an on-site or off-site laboratory that houses the equipment used to monitor the composition of the chemicals. However, each interaction between personnel and a sample poses health risks to the individual and contamination risks to the sample. For instance, an individual could be exposed to hazardous chemicals during the transfer of a sample from its origin into a sample vessel (e.g., spilling or other exposure during a pressurized transfer), a sample vessel can expose hazardous chemicals to an environment and personnel within it if not adequately sealed or otherwise isolated, etc. Additionally, the safety of others involved with the sample handling can depend on other personnel who previously handled the sample container. For example, a laboratory technician could be exposed to residue present on an exterior surface of a sample container if the sample was mishandled during sample gathering or transfer.

In addition to the physical risks associated with mishandling of samples, manual sampling processes can introduce risk of improper identification of a sample. Mislabeling or misidentifying a sample during or after transit from a sampling point can cause information associated with the sample to be erroneously associated with another sample, such as through misplacement of the sample container within the sample rack, misplacement of a sample within a particular sample container, or the like. The ordering of the various containers available to an autosampler can affect the accuracy of data generated from analysis of the samples contained therein. For instance, autosampling systems can rely on a specific or predetermined arrangement of sample containers held within a sample rack while the probe is introduced to each sample container in a serial manner. Results of the analysis of the samples are then tied to the specific or predetermined arrangement following the serial progression. As such, the results of such analysis can be erroneous if an individual deviates from the specific or predetermined arrangement when placing sample containers in the sample rack(s). The risk of error can increase if the individual at the autosampler differs from the individual handling the initial gathering of the sample.

Further, an individual can implement an incorrect analysis protocol for a particular sample, even when the sample is appropriately identified. For instance, the individual can utilize an incorrect calibration protocol, an incorrect dilution factor, or the like for a sample, thereby affecting the usefulness of the results of analysis of the sample. This risk increases as the number of individuals performing the sample preparation increases, which can be problematic for laboratories or industries as training and oversight costs increase. Still further, the particular ordering of samples handled by a sample preparation system can contribute to the performance of a system. For example, incomplete washout of sample between different sample types can lead to a chemical reaction within fluid lines of the system, leading to skewed analytical results or even instrument damage (e.g., testing a base prior to testing a strong acid).

Accordingly, systems and methods for safe collection and transportation of fluid samples for analysis are described having automated sample filling stations and contained portable sample modules to avoid exposure of hazardous materials to personnel during collection and transfer of samples to laboratory processing equipment. A system embodiment includes a filling station to automatically supply a fluid sample, a portable sample module to releasably seat within the filling station to receive the fluid sample, and a sample transfer station to receive the portable sample module and transfer the fluid sample to a container for subsequent analysis. In example implementations, the filling station incorporates interlocks and line cleaning protocols to avoid exposure of hazardous materials to personnel during collection and transfer of samples to laboratory processing equipment, the filling station is fully automated to avoid any manual valve operation by an individual, the sample module is fully enclosed to avoid any manual opening or closing of sample vessels by an individual, and the sample transfer station is fully enclosed to avoid any manual opening or closing of sample vessels by an individual with line cleaning protocols to avoid exposure of hazardous materials to personnel during transfer of the sample from the sample module to a sample bottle. The system can employ sample identifiers (e.g., barcodes, RFID tags, or the like) to associate a sample module with a particular filling station and to associate a sample module with a sample bottle at the sample transfer station to provide accurate sample identification throughout collection, transfer, and analysis of each sample.

Example Implementations

FIG. 1 illustrates a system 100 for safe collection and transportation of fluid samples in accordance with an example implementation of the present disclosure. The system 100 includes a filling station 102, a sample module 104, and a sample transfer station 106 to load a sample received from the sample module 104 into a bottle 108 for subsequent analysis by analytic instrumentation 110 used to test the sample. The filling station 102 supplies a fluid sample to the system 100 and can include a chemical or biochemical supply line, a chemical or biochemical blending system, or other chemical or biochemical source. The filling station 102 is generally positioned at a first location 112 separate from the sample transfer station 106, which is generally positioned at a second location 114. The sample module 104 is a portable device configured to facilitate safe transit of the sample from the filling station 102 to the sample transfer station 106. For example, the sample module 104 receives a sample from the filling station 102 at the first location 112, encloses the sample securely within an enclosure, holds the sample during transport (e.g., via an individual or equipment) to the sample transfer station 106 at the second location 114, and securely docks with the sample transfer station 106 to offload the sample. The sample transfer station 106 facilitates safe transit of the sample from the sample module 104 to one or more containers (e.g., bottle 108) which provide access to the sample by analytic instrumentation 110 used to test the sample. The analytic instrumentation 110 can include, but is not limited to, ICP spectrometry instrumentation (e.g., an Inductively Coupled Plasma Mass Spectrometer (ICP/ICP-MS), an Inductively Coupled Plasma Atomic Emission Spectrometer (ICP-AES), or the like).

Figure 2A:
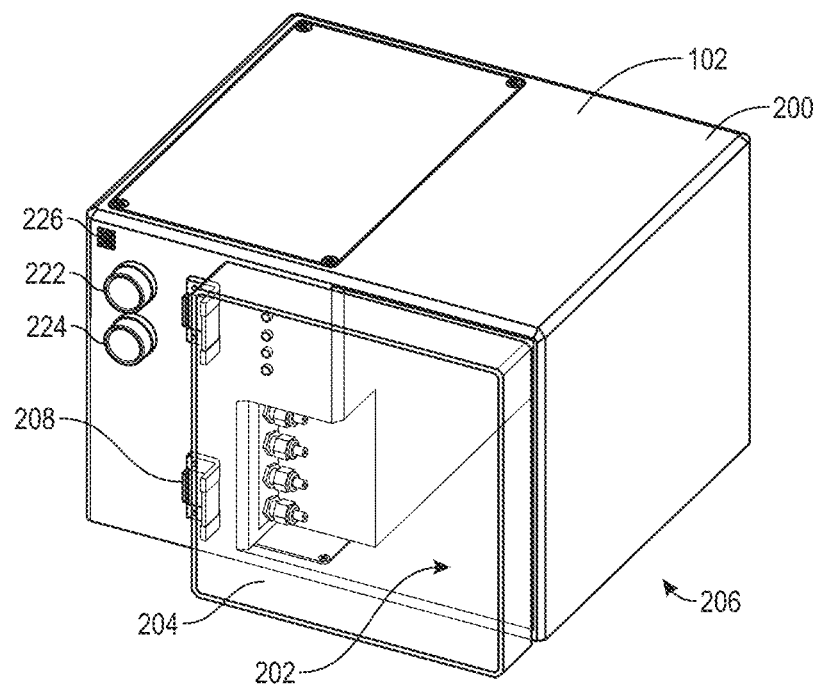
FIG. 2A is an isometric view of a filling station of the system of FIG. 1.
Figure 2B:
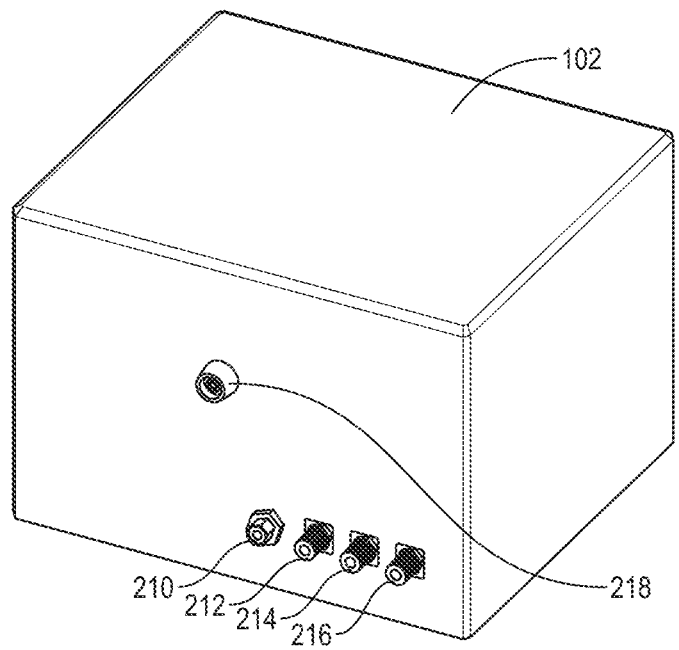
FIG. 2B is a rear view of a filling station of the system of FIG. 1.

Referring to FIGS. 2A and 2B, an example implementation of the filling station 102 is shown. The filling station 102 generally includes an enclosure 200 defining a compartment 202 sized and dimensioned to receive the sample module 104 within the enclosure 200. A cover 204 separates the compartment 202 from the external environment 206. The cover 204 can open (shown in an opened state in FIG. 4A) to receive the sample module 104 within the compartment 202 and close (shown in a closed state in FIG. 2A; direction of closing shown in FIG. 4B) to isolate the sample module 104 from the external environment 206. For example, the cover 204 can rotate about hinges 208 mounted to the enclosure 200. The filling station 102 can include input ports to receive fluids used during operation of the system and output ports to remove fluids from the filling station 102. For example, the filling station 102 is shown including a gas input port 210 (e.g., to receive nitrogen or other inert gas or another gas type or mixture of gases), a rinse fluid input port 212 (e.g., to receive ultrapure water (UPW) or other rinse fluid), a chemical input port 214 (e.g., to receive a chemical sample for transfer to the sample module 104, such as from a chemical supply line, chemical storage tank, a manually transferred sample, or the like), and a waste output port 216 (e.g., to remove purge fluids, rinse fluids, chemical overflow, or the like). The filling station 102 can further include a power connector 218 to receive power to operate pumps, valves, sample module interlocks, or the like. The filling station 102 also includes ports 220 configured to couple with corresponding ports of the sample module 104 (described further herein with respect to FIG. 5). The ports 220 can be positioned within the enclosure 200 where the cover 204 can provide access to the ports 220 when opened and can isolate the ports 220 from the external environment 206 when closed. This can prevent inadvertent contact between personnel and any chemical residue present at or adjacent the ports 220 and can prevent contamination of the ports from the external environment 206. The filling station 102 can also include one or more user inputs to begin or end filling operations. For example, the filling station 102 is shown with a load switch 222 and a stop switch 224 coupled to the enclosure to permit personnel to begin and end the filling of the sample module 104, respectively, such as by enabling a pressure source (e.g., a pump, a vacuum, a pressurized fluid line, etc.) to flow fluids through the various connections between the filling station 102 and the sample module 104.

A filling station identifier 226 unique to the filling station 102 can be positioned on the enclosure 200 to associate the identification of the particular filling station 102, where such identification is further associated with a given sample module 104 when sample is transferred from the filling station 102 to the sample module 104. For example, a technician can scan the filling station identifier 226 and a sample module identifier 316 associated with the sample module 104 with an optical scanner to indicate an association between the particular filling station 102 and the particular sample module 104. The filling station identifier 226 and the sample module identifier 316 can include, for example, a barcode, a data matrix two-dimensional (2D) barcode, an RFID tag, or other identifier.

Figure 3A:
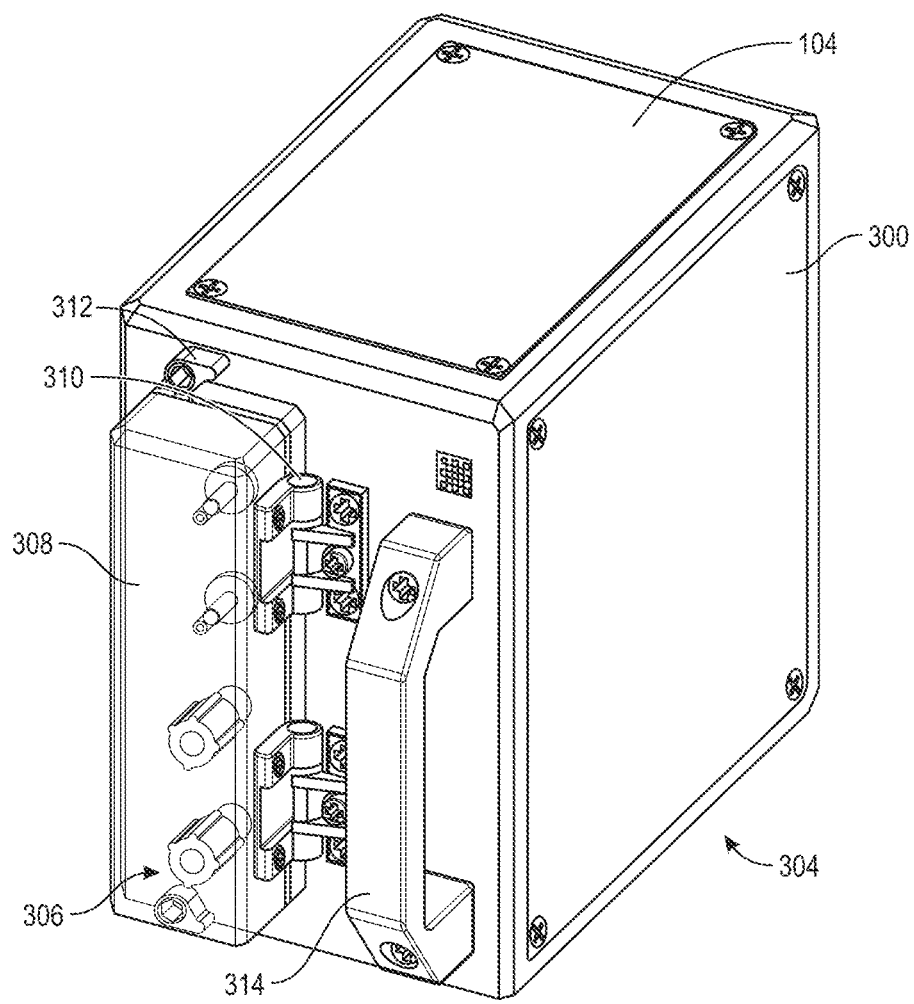
FIG. 3A is an isometric view of a sample module of the system of FIG. 1.
Figure 3B:
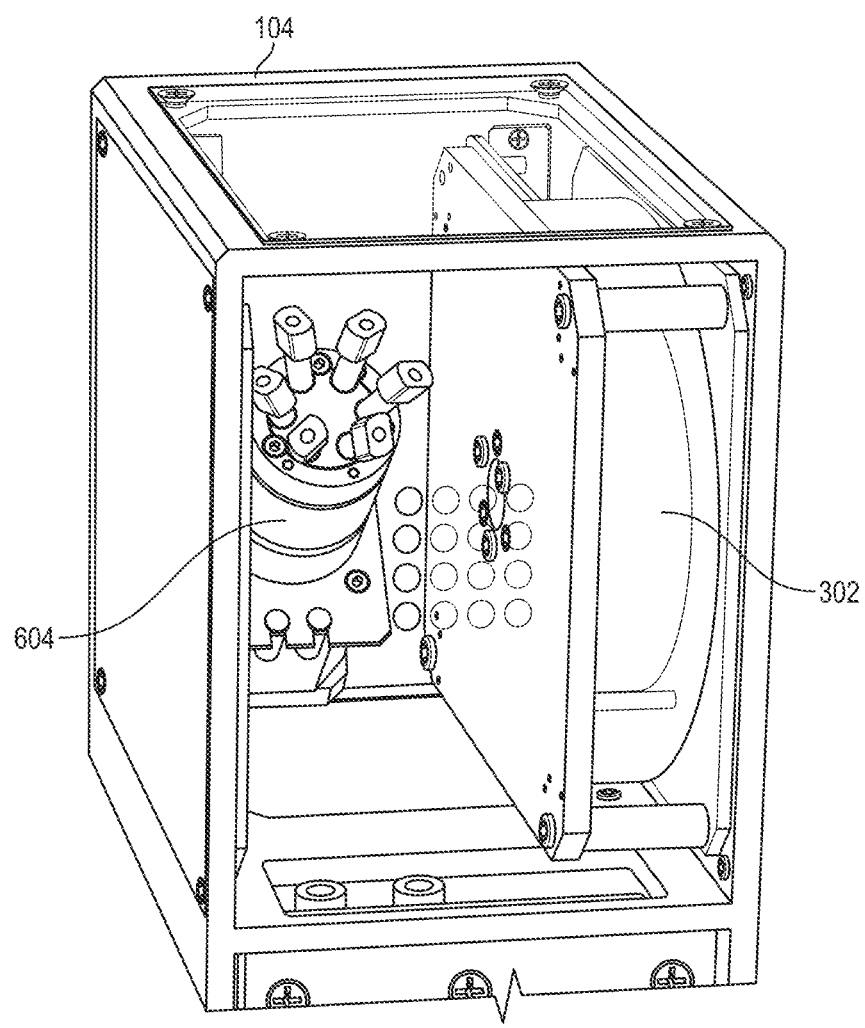
FIG. 3B is a partial isometric view of the sample module of FIG. 3A.
Figure 4A:
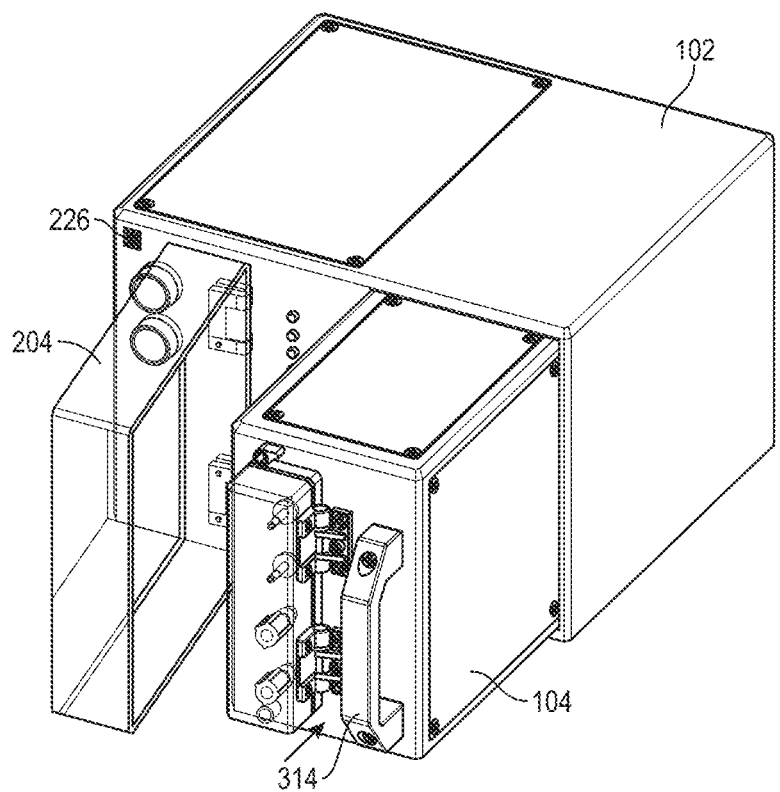
FIG. 4A is an isometric view of the sample module being inserted into the filling station of FIG. 2A to receive a sample.
Figure 4B:
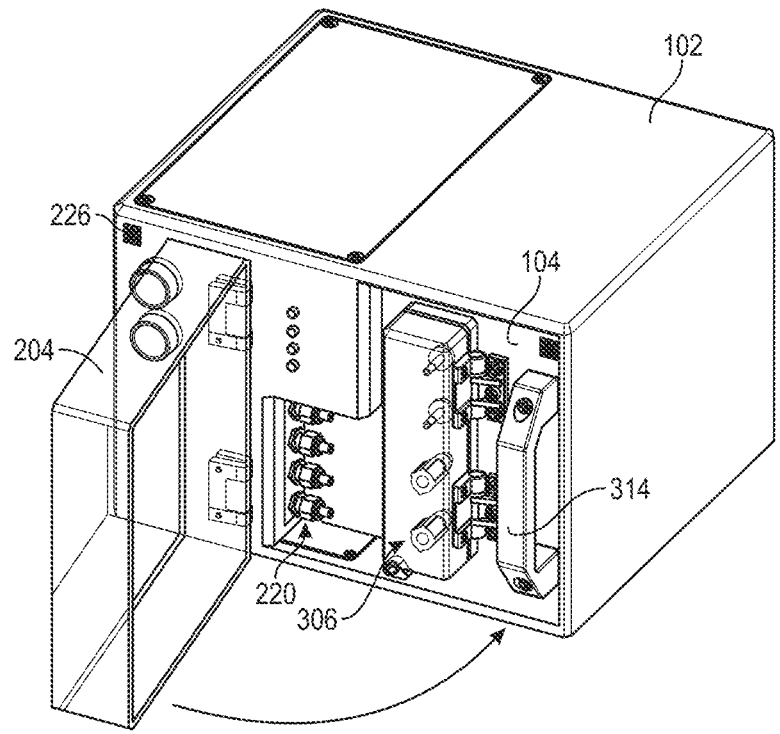
FIG. 4B is an isometric view of the sample module seated within the filling station.

Referring to FIGS. 3A and 3B, an example implementation of the sample module 104 is shown. The sample module 104 generally includes an enclosure 300 containing a sample loop 302 (e.g., shown in FIG. 3B). The sample loop 302 can include a length of tubing (e.g., in a coil configuration or otherwise disposed within the enclosure 300) having a volume to hold sample therein within the enclosure 300. The enclosure 300 separates the sample loop 302 from the external environment 304 to prevent exposure to individuals or equipment transporting the sample module 104. The enclosure 300 is generally sized and dimensioned to be received into the compartment 202 of the filling station 102 to facilitate transfer of fluid sample from the filling station 102 and the sample module 104. For example, the sample module 104 includes ports 306 configured to couple with the ports 220 of the filling station 102 to receive fluids from the filling station during sample transfer, rinse protocols, and the like. The sample module 104 can include a cover 308 coupled to the enclosure 300 to isolate the ports 306 from the external environment 304 when closed. For example, the cover 308 can rotate about hinges 310 to open to provide access to the ports 306 (e.g., during sample collection at the filling station 102) and to close to prevent access to the ports 306 (e.g., during transit of the sample module 104 to the sample transfer station 106). A lock 312 can secure the cover 308 in the closed position. The sample module 104 can also include a handle 314 to provide personnel with a grip to insert the sample module 104 into the compartment 202 of the filling station 102 (e.g., as shown in FIG. 4A), to remove the sample module 104 from the filling station 102, and to carry the sample module 104 during transit to the sample transfer station 106 or another location. A sample module identifier 316 unique to the sample module 104 can be positioned on the enclosure 300 to associate the identification of the particular sample module 104, where such identification is further associated with a given filling station 102 when sample is transferred from the filling station 102 to the sample module 104, and with a particular bottle 108 or other container when transferred at the sample transfer station 106. The sample module identifier 316 can include, for example, a barcode, a data matrix two-dimensional (2D) barcode, an RFID tag, or other identifier. Similarly, the bottle 108 or other container can include a bottle identifier (e.g., bottle identifier 116 shown in FIG. 1) unique to the bottle 108 to identify aspects of the bottle 108 within the system 100. The bottle identifier 116 can include, for example, a barcode, a data matrix two-dimensional (2D) barcode, an RFID tag, or other identifier.

Figure 5:
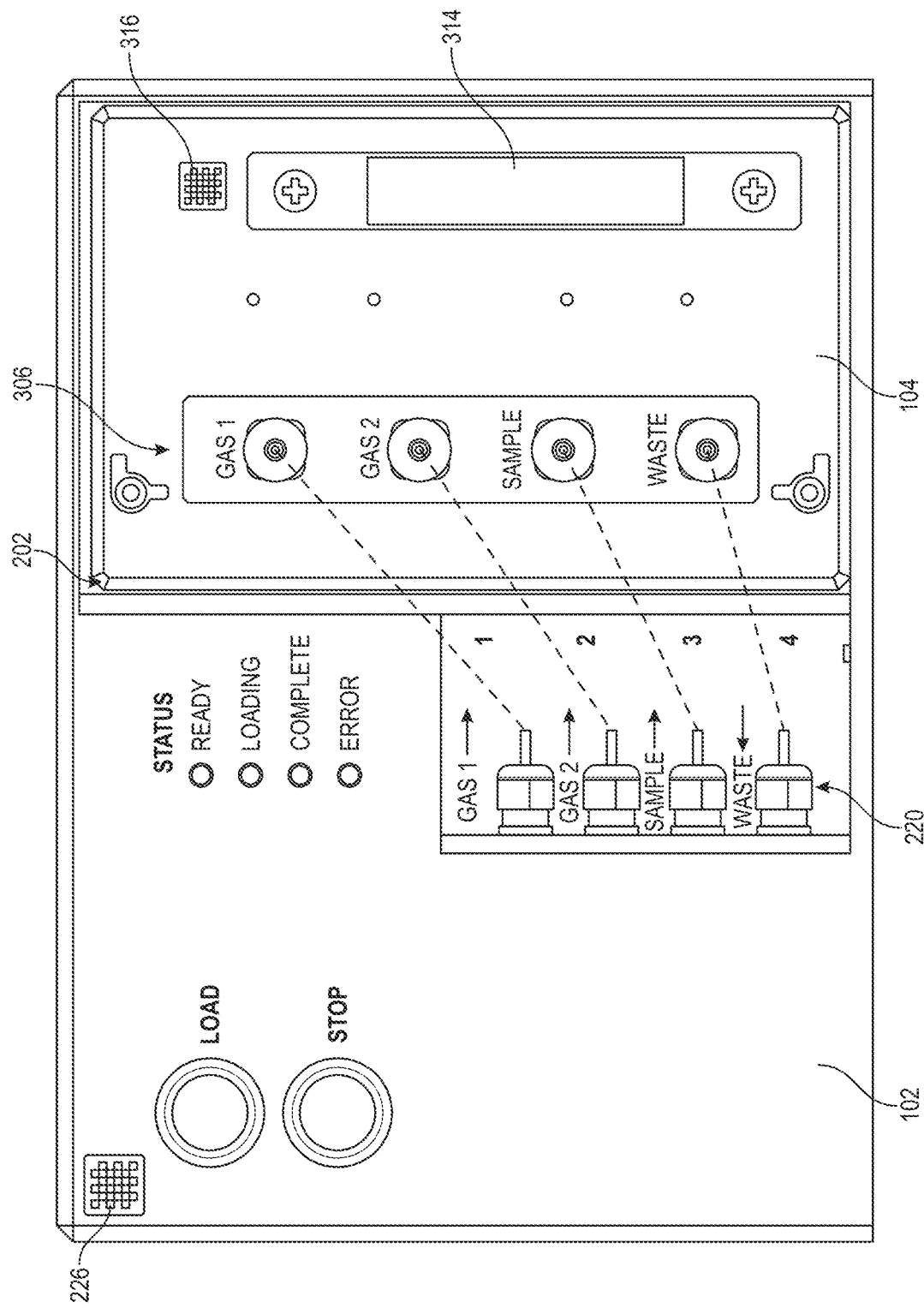
FIG. 5 is a front view of the sample module seated within the filling station with the associated fluid connections between the filling station and the sample module.

Referring to FIG. 5, the sample module 104 is shown seated within the compartment 202 of the filling station 102. The ports 220 of the filling station 102 can be coupled with the corresponding ports 306 of the sample module 104 via tubes or other fluid connectors to transfer fluids between the filling station 102 and the sample module 104. For example, the fluids can be supplied to the filling station 102 via ports 210, 212, and 214 and through ports 220 to the ports 306 of the sample module 104 to provide purge gas, rinse fluid, chemical sample, and waste fluid connections between the filling station 102 and the sample module 104. Example rinse operations and sample transfer are described with reference to FIGS. 6A through 6E. In an implementation, the ports 220 are coupled to the ports 306 via a single connector that includes couplings for each of the ports to provide a one-piece connector to push onto the ports 220 or ports 306.

Referring to FIGS. 6A through 6E, the sample module 104 is shown seated within the filling station 102 to facilitate the transfer of sample from the filling station 102 to the sample module 104 at the first location 112. The filling station 102 or the sample module 104 can include an interlock structure to hold the enclosure 300 within the compartment 202 during operation of the filling station 102 to prevent personnel from breaking fluid connections between the sample module 104 and the filling station 102 during transfer of fluids and the potential exposure to hazardous chemicals. For example, the interlock structure can include a solenoid-activated lock, an electromagnetic lock, or other structure configured to hold the enclosure 300 within the compartment 202 while the interlock structure is activated. Upon completion of the sample transfer procedures, the interlock structure can decouple the sample module 104 from the filling station 102 to permit removal of the sample module 104. Alternatively or additionally, the filling station 102 can include a lock to secure the cover 204 in the closed position during transfer of fluids from the filling station 102 to the sample module 104 to prevent personnel from inadvertently disconnecting the sample module 104 while fluids are being transferred.

Figure 6A:
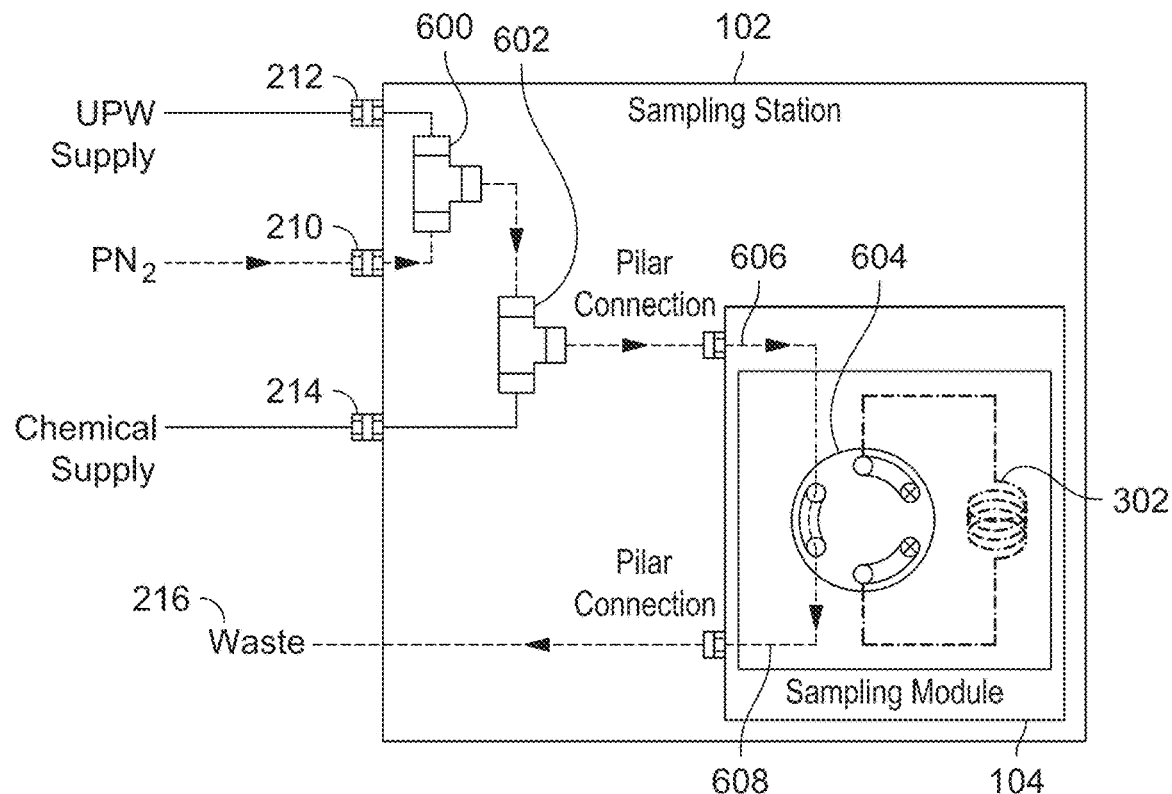
FIG. 6A is a schematic illustration of the sample module seated within the filling station in a pressure test configuration.

The system 100 is shown in an example pressure test configuration in FIG. 6A. For instance, the pressure test configuration tests the fluid connections between the filling station 102 and the sample module 104 and within the filling station 102 and the sample module 104 to ensure that no leaks are present prior to introduction of potentially hazardous chemical sample. In the pressure test configuration, fluid (e.g., purified nitrogen ($PN_2$)) is directed through the port 210 through connectors 600 and 602 into the sample module 104. The sample module 104 includes a connector or valve (e.g., valve 604) that changes configurations between at least a first flow path configuration, allowing access to the sample loop 302, and a second flow path configuration bypassing the sample loop 302 via fluid line 608. In the pressure test configuration, the valve 604 is provided in a first flow path configuration to direct the fluid from fluid line 606 (which is coupled to connector 602) and into fluid line 608, bypassing the sample loop 302 before leaving the sample module 104 and out the port 216. The valve 604 can include, for example, an electrically-actuated valve having controllable rotor and stator positions to direct fluid through differing port configuration (e.g., shown in FIG. 3B), a pneumatically-actuated valve, or the like. A flow sensor, pressure sensor, or other sensor configured to detect leaks within the system 100 can determine whether the fluid directed through the port 210 is exiting the port 216, or whether a leak or blockage is present. If a leak or blockage is present, the filling station can generate an alert or otherwise notify personnel of an issue and record the error. If no leak or blockage is present, then the system 100 can proceed to a rinse procedure.

Figure 6B:
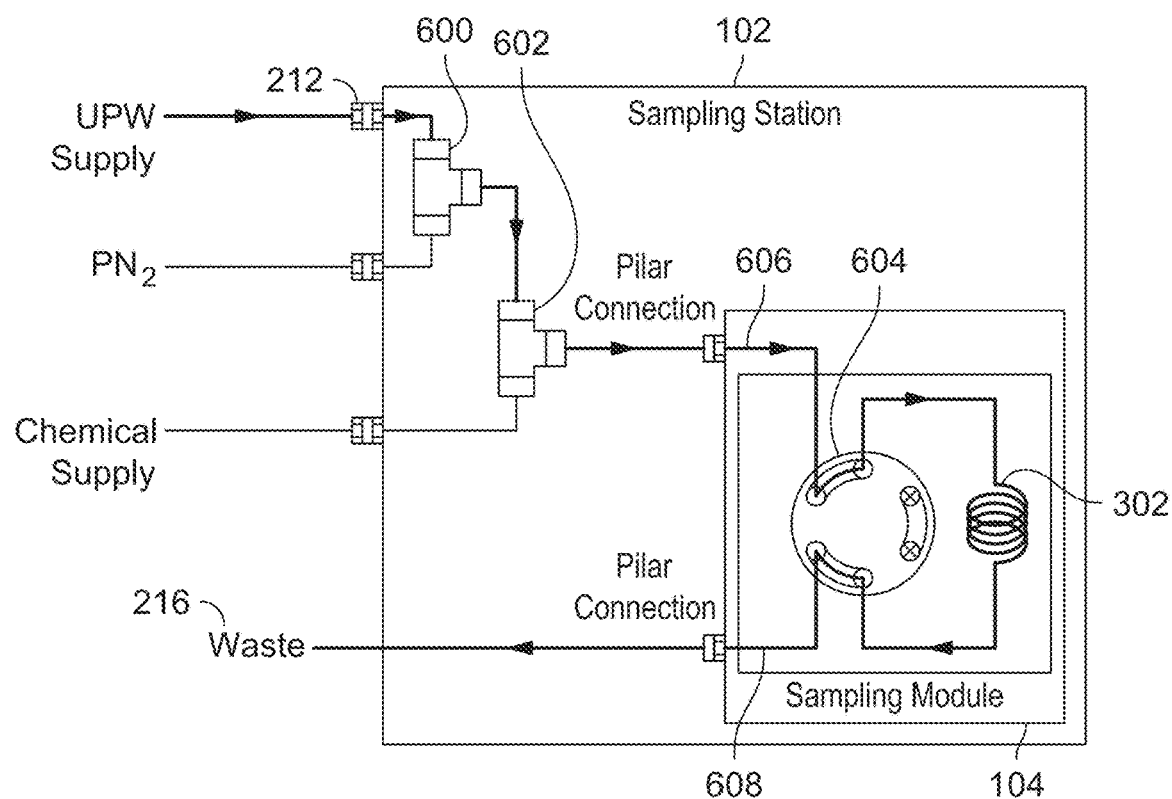
FIG. 6B is a schematic illustration of the sample module seated within the filling station in a rinse configuration.

The system 100 is shown in an example rinse configuration in FIG. 6B, where rinse fluid is directed through the sample loop 302 to rinse the sample loop 302 in preparation to receive sample. In the rinse configuration, rinse fluid (e.g., ultrapure water (UPW)) is directed through the port 212 through connectors 600 and 602 into the sample module 104. The valve 604 is in the second flow path configuration to direct the fluid from the fluid line 606 through the sample loop 302 and into fluid line 608 before leaving the sample module 104 and out the port 216.

Figure 6C:
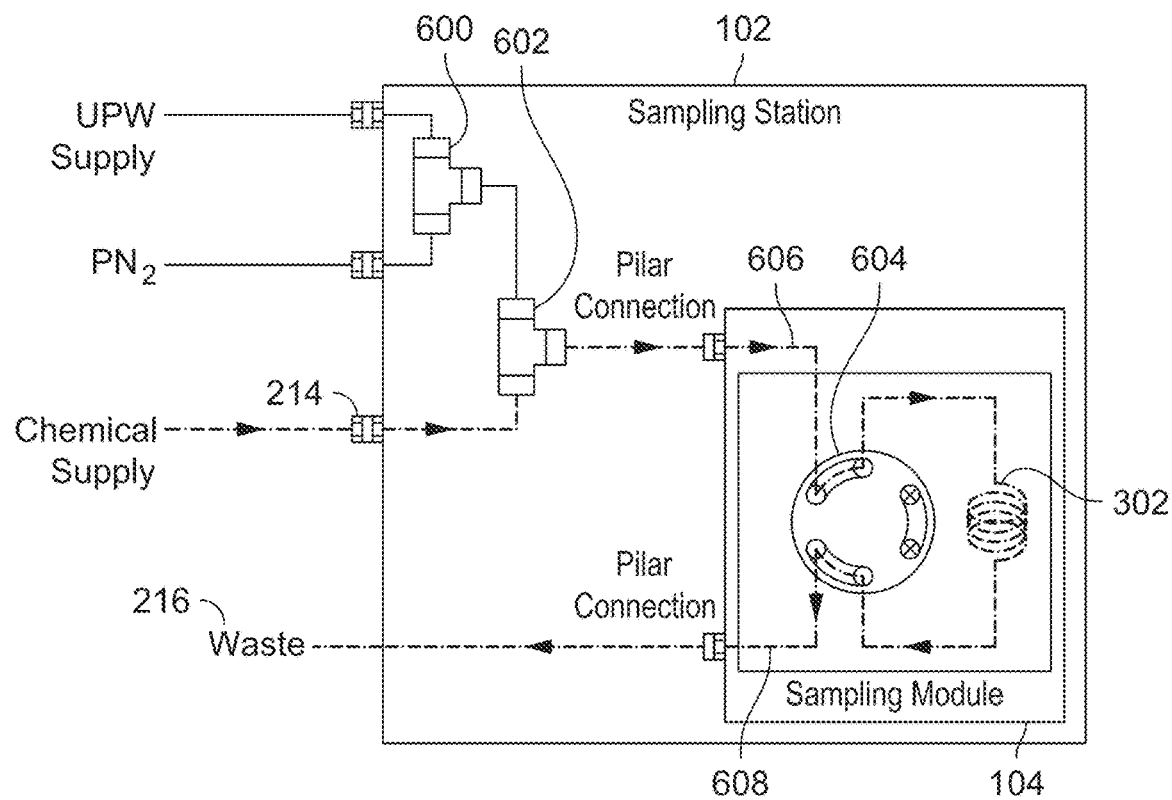
FIG. 6C is a schematic illustration of the sample module seated within the filling station in a sample collect configuration.

The system 100 is shown in an example sample collect configuration in FIG. 6C, where sample is directed through the sample loop 302 for collection. In the sample collect configuration, a sample fluid (e.g., chemical from the chemical supply at the filling station 102) is directed through port 214 through connector 602 and into the sample module 104. The valve 604 is in the second flow path configuration to direct the sample fluid from the fluid line 606 through the sample loop 302, and into fluid line 608 before leaving the sample module 104 and out the port 216. In implementations, the sample loop 302 is rinsed with sample fluid to remove any residual rinse fluid, with the sample fluid rinse sent to waste through port 216. Following rinse of the sample loop 302 with the sample fluid, additional sample fluid is directed through the sample loop 302, filling the sample loop 302 with sample fluid. The configuration of the valve 604 is then switched (e.g., from the second flow path configuration to the first flow path configuration) to hold the sample fluid within the filled sample loop 302.

Figure 6D:
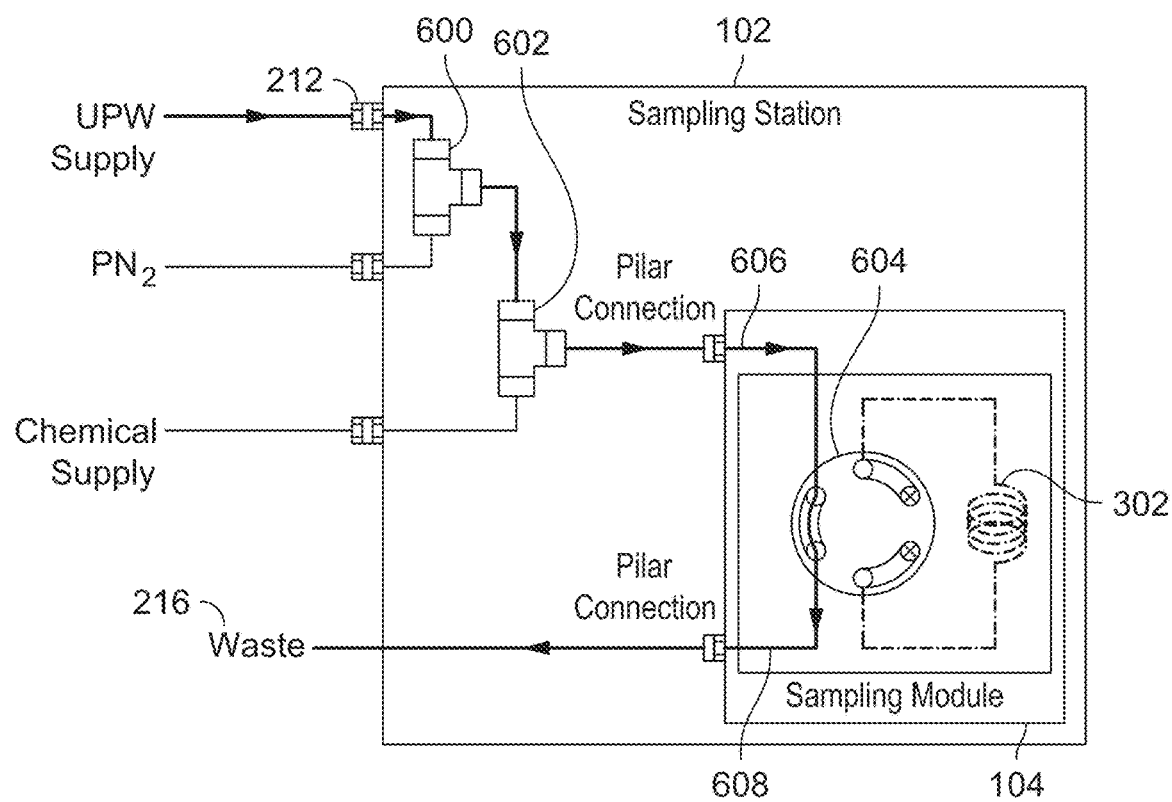
FIG. 6D is a schematic illustration of the sample module seated within the filling station in a connection rinse configuration.

The system 100 is shown in an example connection rinse configuration in FIG. 6D, where rinse fluid is directed through the filling station 102 and the sample module 104 to clean connections of sample fluid while maintaining the sample fluid within the sample loop 302. In the rinse configuration, rinse fluid (e.g., ultrapure water (UPW)) is directed through the port 212 through connectors 600 and 602 into the sample module 104. The valve 604 is in the first flow path configuration to direct the rinse fluid from the fluid line 606 through the fluid line 608, bypassing the sample loop 302 before leaving the sample module 104 and out the port 216.

Figure 6E:
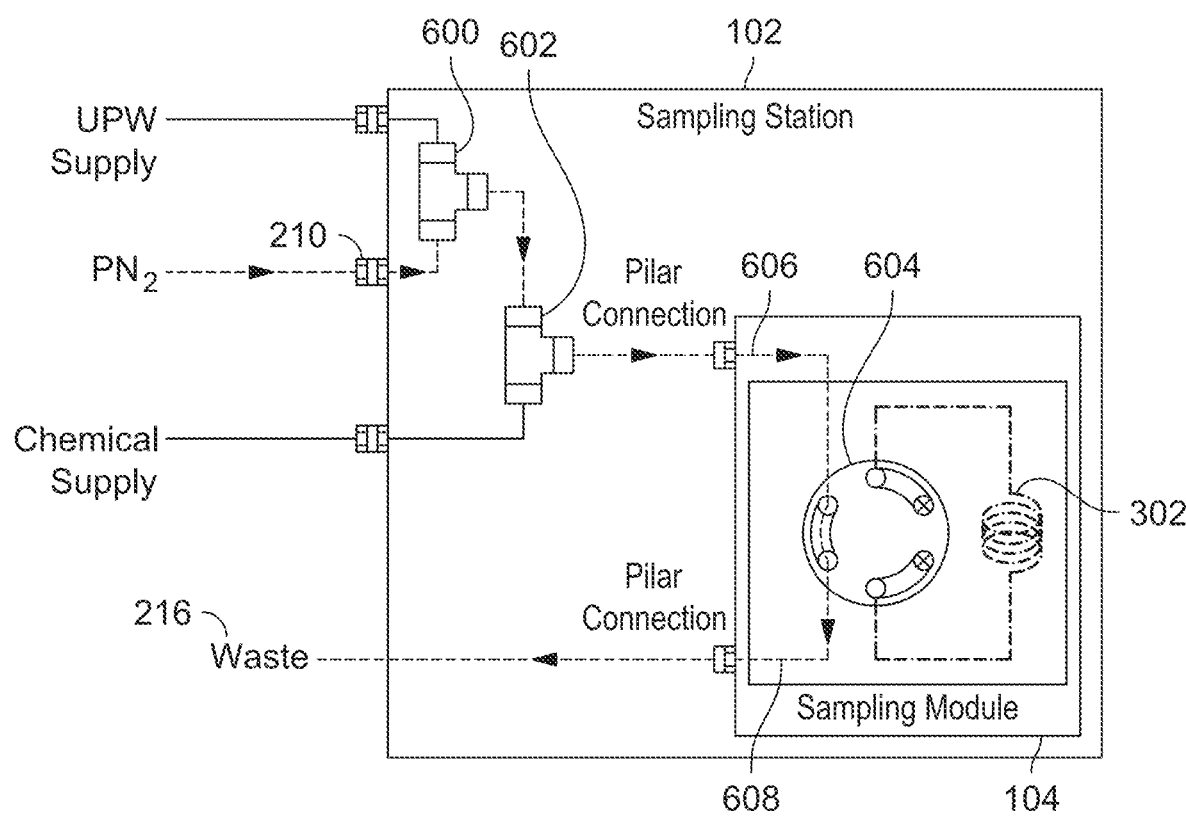
FIG. 6E is a schematic illustration of the sample module seated within the filling station in a connection purge configuration.

The system 100 is shown in an example connection purge configuration in FIG. 6E, where gas is sent through the filling station 102 and the sample module 104 to purge the fluid lines of any residual rinse fluid or other fluids while maintaining the sample fluid within the sample loop 302. In the connection purge configuration, fluid (e.g., purified nitrogen ($PN_2$)) is directed through the port 210 through connectors 600 and 602 into the sample module 104. The valve 604 is in the first flow path configuration to direct the fluid from the fluid line 606 through the fluid line 608, bypassing the sample loop 302 before leaving the sample module 104 and out the port 216. Following the connection purge operation, the sample fluid is isolated within the sample loop 302 and all potentially hazardous chemicals are cleared from all connections between the filling station 102 and the sample module 104. The filling station 102 can generate an alert (e.g., illuminate a light indicating "complete," sending a message to an observation station, or the like) to signal completion of the filling process. Personnel can then safely disconnect connections between the ports 220 and 306 and remove the sample module 104 from the filling station 102 (e.g., by pulling the handle 314). The sample module 104 then contains a sample ready for transport to the sample transfer station 106 at the second location 114.

Referring to FIG. 7, an example implementation of the sample transfer station 106 is shown. The sample transfer station 106 generally includes one or more bays 700 to receive one or more sample modules 104 therein. FIG. 7 shows eighteen (18) bays 700, each configured to receive one sample module 104, however the present disclosure is not limited to eighteen bays 700 and can include fewer than eighteen bays 700 or more than eighteen bays 700. The sample transfer station 106 also includes an autosampler 702 configured to transfer sample from each sample module 104 to sample containers (e.g., bottles 108) located on a deck 704 of the autosampler 702. For example, each bay 700 includes a fluid connection between the bay 700 and the autosampler 702 to permit the autosampler 702 to draw the sample fluid held in the sample loop 302 out from the sample module 104 and into the sample containers on the deck 704 (e.g., via sample probe of the autosampler 702). A pump or pressure source can facilitate transfer of the sample fluid via the autosampler 702. In implementations, the autosampler 702 is enclosed within a housing or hood to separate the sample containers from the external environment of the sample transfer station 106 at the second location 114. Example rinse operations and sample transfer are described with reference to FIGS. 8A through 8E. In implementations, the autosampler 702 includes an identifier capture device to scan and identify individual bottles 108 on the deck 704 to associate a specific identity of the bottle 108 with the specific identity of a given sample module 104 that is having the sample fluid transferred into the specific bottle 108. For example, the autosampler 702 can include a PlasmaTRAX automated sample identification and tracking system (Elemental Scientific, Omaha, Nebr.) to scan the bottles 108 and record an association between the bottles 108 and the sample modules 104 from which the sample fluids are transferred, and an association between the bottles 108 and the origin of the sample fluids held in the sample modules 104 (e.g., via association between the filling station identifier 226 and the sample module identifier 316). The sample transfer station 106 can include a computer terminal 706 or other user interface to provide access to the data associated with operation of the system 100.

Figure 8A:
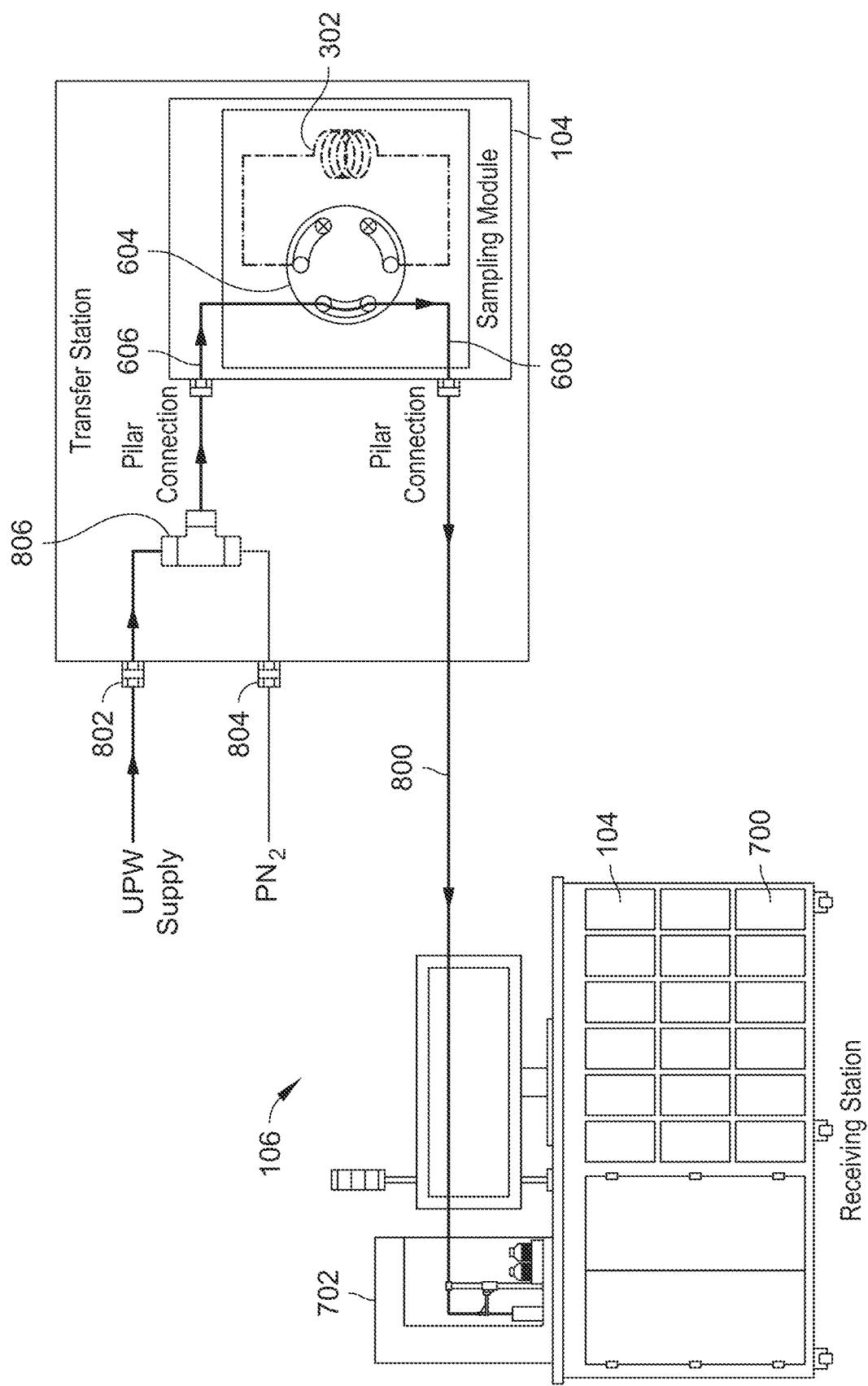
FIG. 8A is a schematic illustration of the sample module seated within the sample transfer station in a transfer line rinse configuration.

The system 100 is shown in an example transfer line rinse configuration in FIG. 8A. For instance, the transfer line rinse configuration flushes a transfer line 800 coupled between the autosampler 702 and the sample module 104 to remove any residual fluids in the transfer line following prior sample transfers or handling of other fluids. The sample transfer station 106 is shown including a rinse fluid input port 802 (e.g., to receive ultrapure water (UPW) or other rinse fluid) and a gas input port 804 (e.g., to receive nitrogen or other inert gas or another gas type or mixture of gases), and a port 806 to couple the sample module 104 to the transfer line 800. In the transfer line rinse configuration, rinse fluid (e.g., UPW) is directed through the port 802 through connector 806 into the sample module 104. The valve 604 of the sample module 104 is in the first flow path configuration to direct the rinse fluid from the fluid line 606 through the fluid line 608, bypassing the sample loop 302 before leaving the sample module 104 and out the port 808 into the transfer line 800 to the autosampler 702. The autosampler 702 can direct the rinse fluid to waste or a storage location.

Figure 8B:
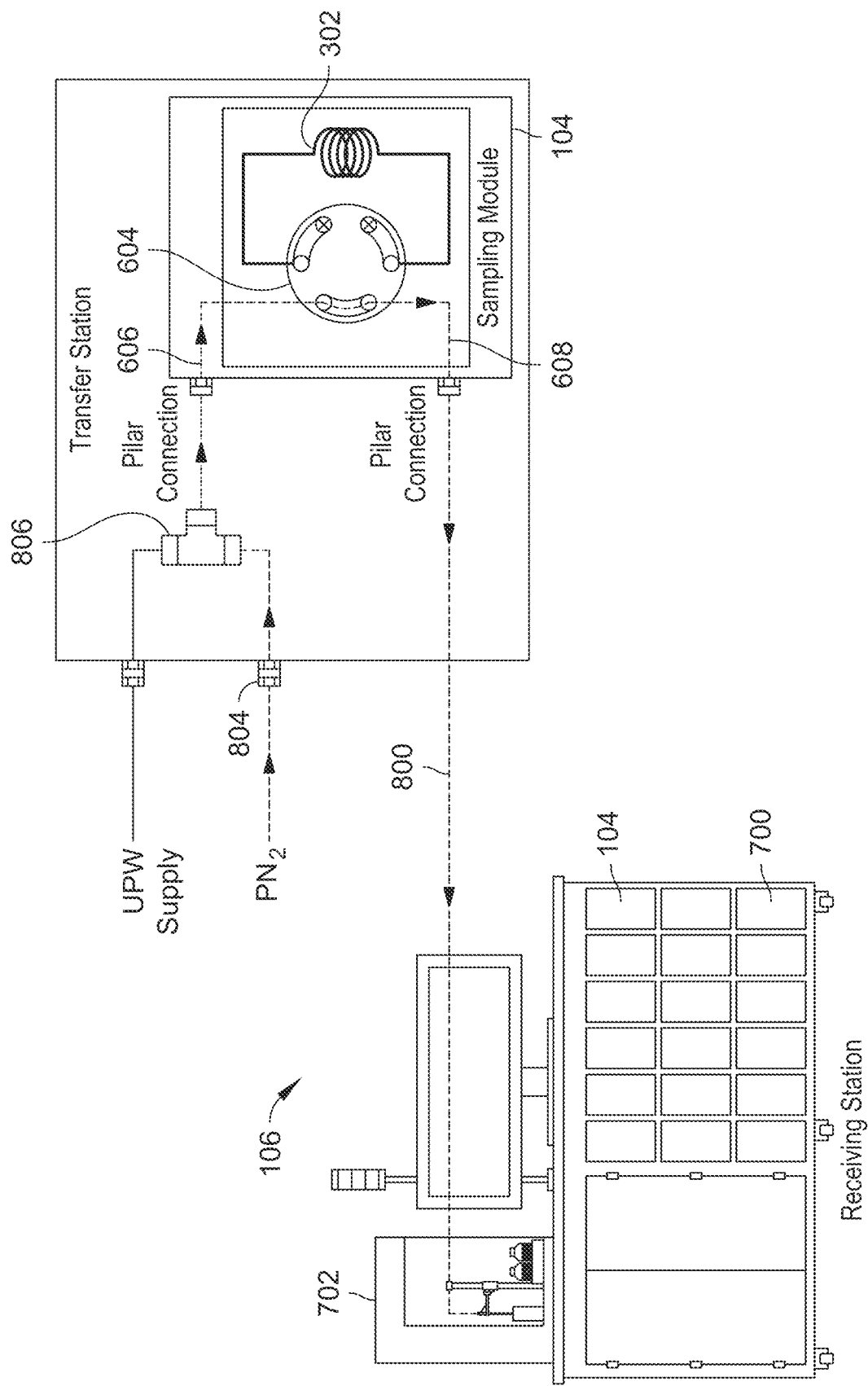
FIG. 8B is a schematic illustration of the sample module seated within the sample transfer station in a transfer line purge configuration.

The system 100 is shown in an example transfer line purge configuration in FIG. 8B, where gas is sent through the sample transfer station 106 and the sample module 104 to purge the fluid lines and transfer line 800 of any residual rinse fluid or other fluids while maintaining the sample fluid within the sample loop 302. In the transfer line purge configuration, fluid (e.g., purified nitrogen ($PN_2$)) is directed through the port 804 through connector 806 into the sample module 104. The valve 604 is in the first flow path configuration to direct the fluid from the fluid line 606 through the fluid line 608, bypassing the sample loop 302 before leaving the sample module 104 and out the port 808 into the transfer line 800 to the autosampler 702. Following the transfer line purge operation, the pathway between the autosampler 702 and the sample loop 302 is clear of any contaminants, diluents, or other material that could mix with the sample during transfer from the sample loop 302 through the transfer line 800 and into the autosampler 702.

Figure 8C:
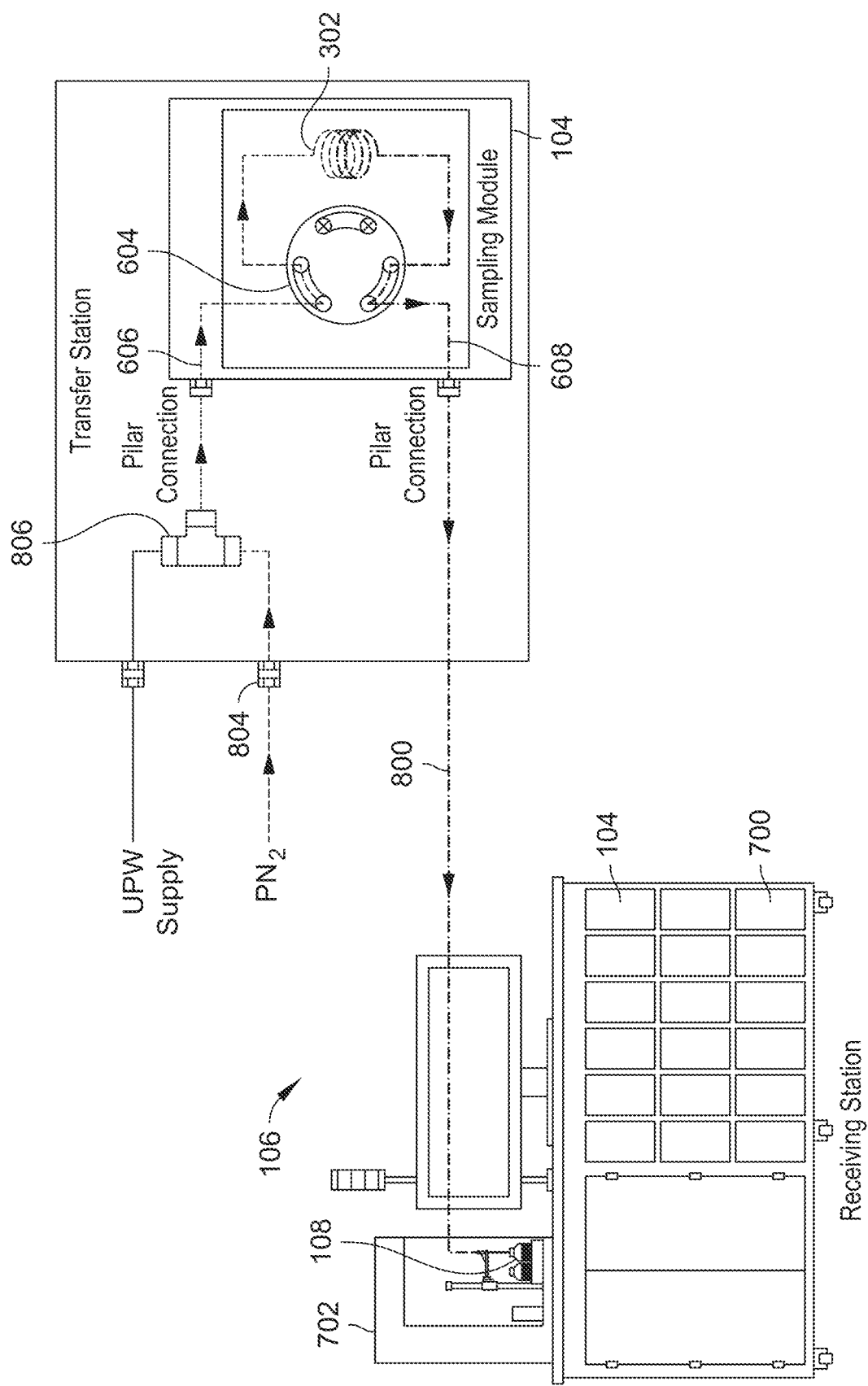
FIG. 8C is a schematic illustration of the sample module seated within the sample transfer station in a sample transfer configuration.

The system 100 is shown in an example sample transfer configuration in FIG. 8C, where sample held in the sample loop 302 is transferred from the sample module 104 to the sample transfer station 106. In the sample transfer configuration, fluid introduced to port 804 is used to push sample from the sample loop 302 and into the transfer line 800. For example, fluid (e.g., purified nitrogen ($PN_2$)) is directed through the port 804 through connector 806 into the sample module 104, where the valve 604 is in the second flow path configuration to direct the fluid from the fluid line 606 through the sample loop 302 and into the fluid line 608 to push the sample fluid out the port 808 into the transfer line 800 to the autosampler 702 to be dispensed into a bottle 108 or other container. The bottle 108 or other container can then be directed to analytic instrumentation used to test the sample (e.g., analytic instrumentation 110).

Figure 8D:
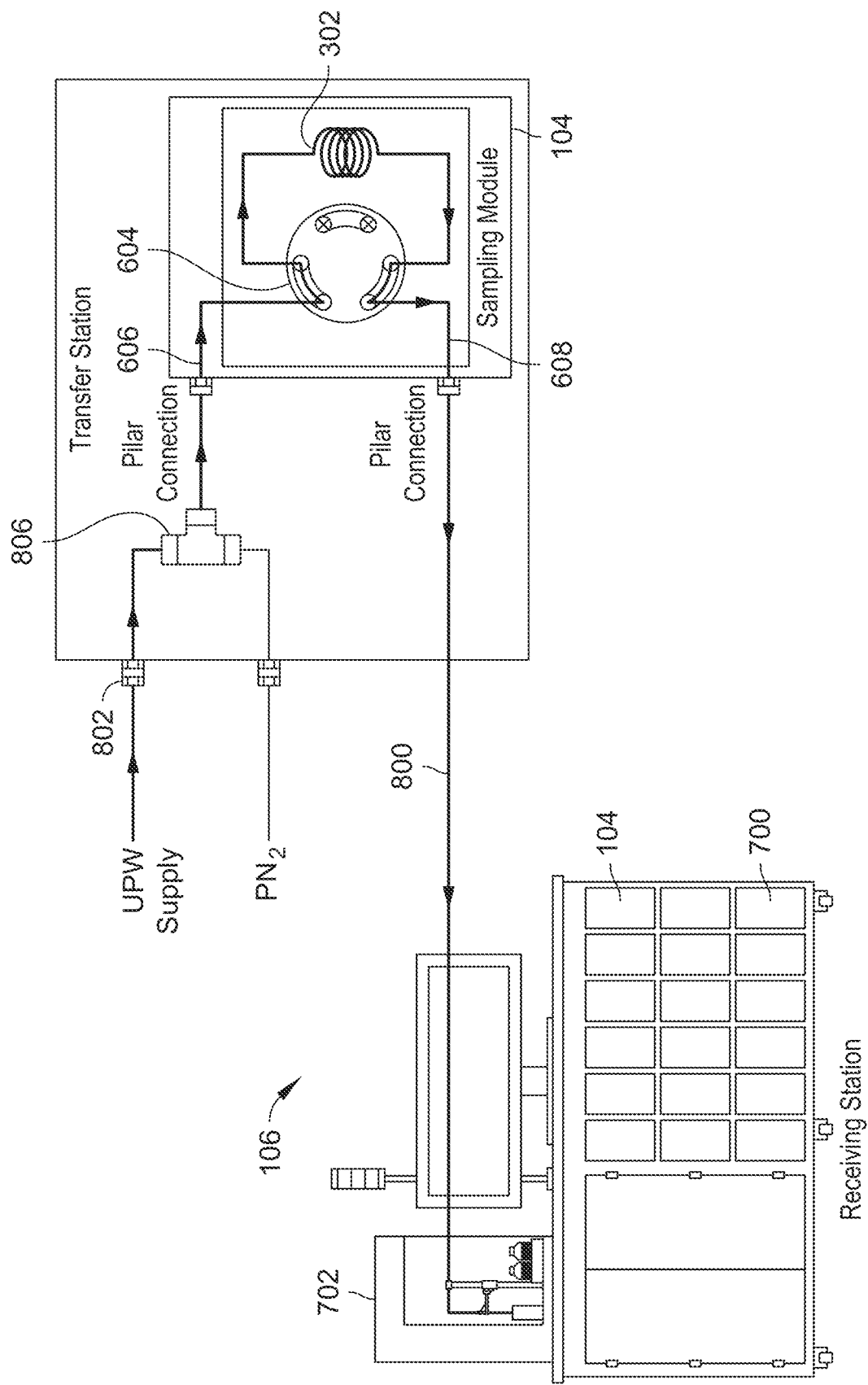
FIG. 8D is a schematic illustration of the sample module seated within the sample transfer station in a rinse configuration.

The system 100 is shown in an example rinse configuration in FIG. 8D, where the sample transfer station 106 rinses the sample loop 302 while the sample module 104 is docked within the bay 700. In the rinse configuration, rinse fluid (e.g., ultrapure water (UPW)) is directed through the port 802 through connector 806 into the sample module 104, where the valve 604 is in the second flow path configuration to direct the fluid from the fluid line 606 through the sample loop 302 and into the fluid line 608 before leaving the sample module 104 and out the port 808 into the transfer line 800 to the autosampler 702.

Figure 8E:
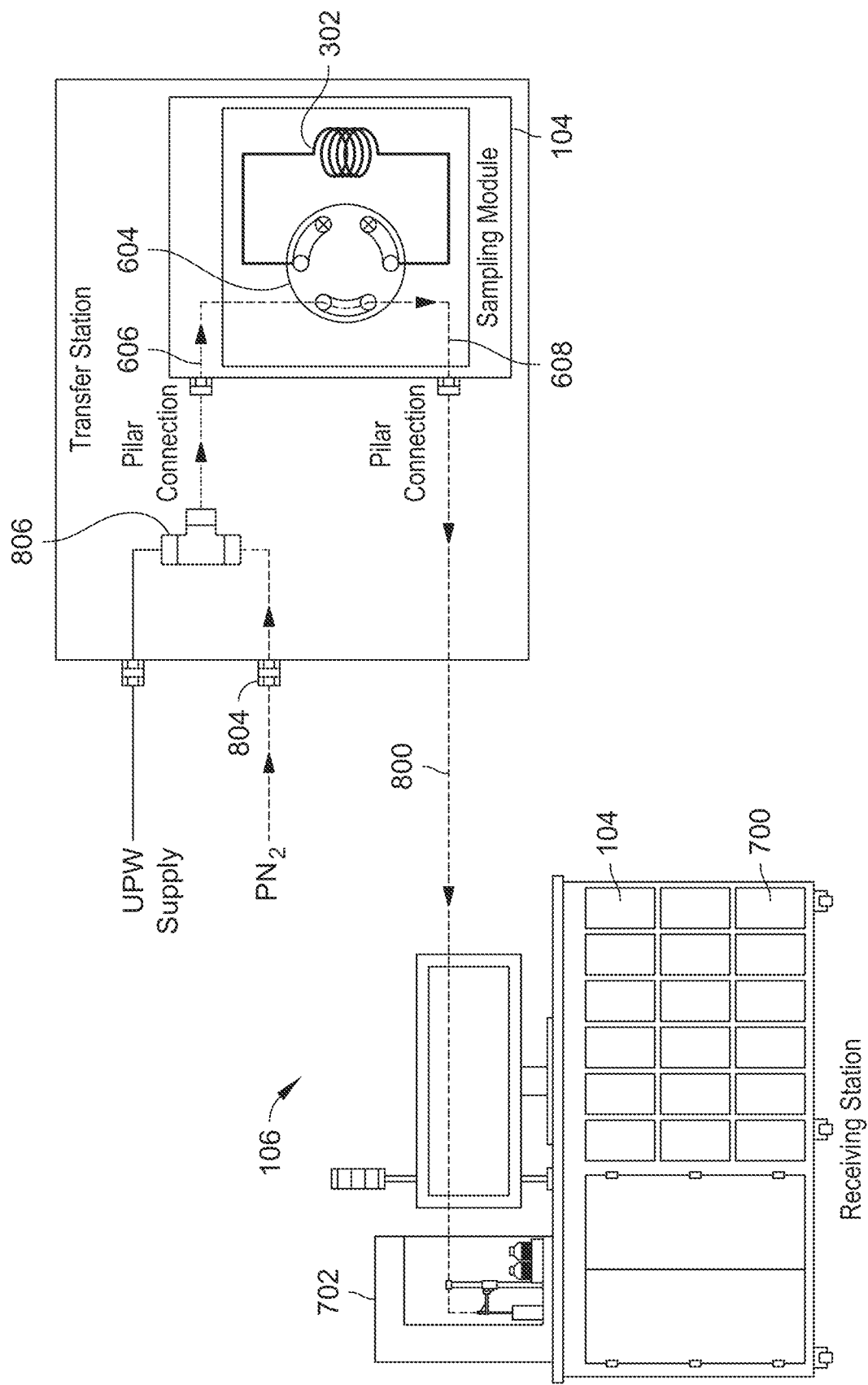
FIG. 8E is a schematic illustration of the sample module seated within the sample transfer station in a purge configuration.

The system 100 is shown in an example purge configuration in FIG. 8E, where gas is sent through the sample transfer station 106 and the sample module 104 to purge the fluid lines of any residual rinse fluid or other fluids while maintaining rinse fluid within the sample loop 302. Alternatively or additionally, rinse fluid can be purged from the sample loop 302. In the purge configuration, fluid (e.g., purified nitrogen ($PN_2$)) is directed through the port 804 through connector 806 into the sample module 104. The valve 604 is in the first flow path configuration to direct the fluid from the fluid line 606 through the fluid line 608, bypassing the sample loop 302 before leaving the sample module 104 and out the port 808 into the transfer line 800 to the autosampler 702. Alternatively, the valve 604 can be in the second flow path configuration to purge rinse fluid from the sample loop 302 to prepare the sample loop 302 to receive a sample at a later time or location. Following the purge operation, the transfer line 800 is cleaned of any residual fluid, ready to receive sample from another sample module 104 positioned in another bay 700.

Figure 9:
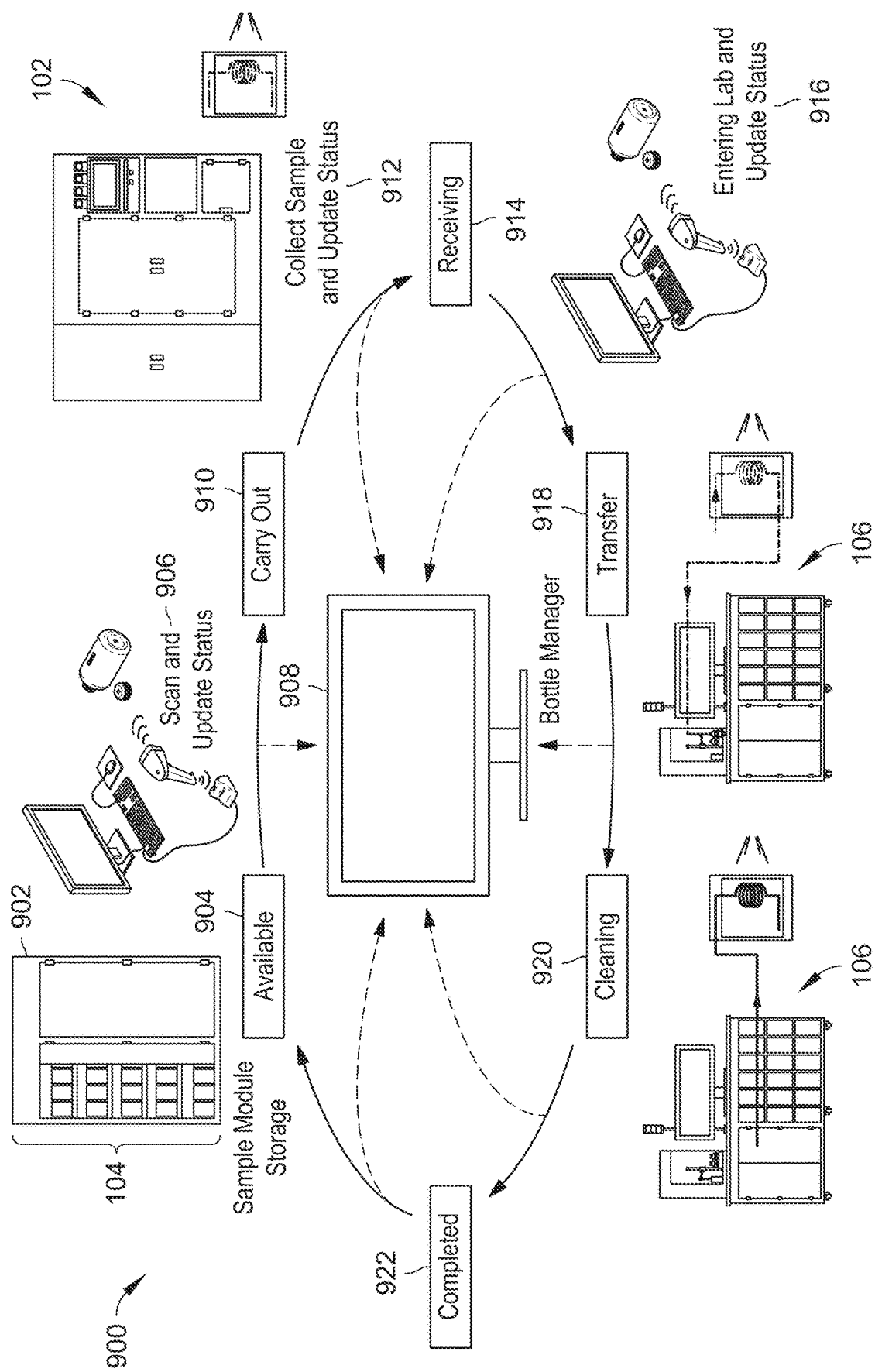
FIG. 9 is a flow diagram for tracking status of a sample module in accordance with example implementations of the present disclosure.

The status of individual sample modules 104 can be tracked by the system 100. For example, FIG. 9 illustrates an example method 900 of tracking the status of a particular sample module 104 with the system 100. Method 900 includes storing a sample module 104 to be available for use at a filling station 102 (block 904). For example, multiple sample modules 104 can be stored at storage units 902 in clean and rinsed states. The system 100 logs the status associated with the particular sample module identifier 316 as being stored at the storage unit 902. The storage unit 902 can include its own identifier if multiple storage units 902 are utilized within a facility to uniquely identify one storage unit 902 from another. Method 900 also includes scanning the sample module identifier 316 (e.g., with an optical scanner, RFID scanner, or other device) to update the status of the particular sample module 104 with the system 100 (block 906). The status information can be sent to a centralized system 908 having databases that track the status of the sample modules 104 utilized throughout the system. Status information can include, but is not limited to, current location of the sample module 104, previous location(s) of the sample module 104, sample type held by the sample module 104, transfer status of the sample module 104, cleanliness status of the sample module 104, and the like. Method 900 also includes carrying the sample module 104 to a particular filling station 102 (block 910). For example, personnel can retrieve the sample module 104 from the storage unit 902 and carry the sample module 104 to the location (e.g., first location 112) of the filling station 102 from which a sample is to be extracted and tested.

Method 900 also includes collecting a sample and updating the status of the sample module 104 with the system 908 (block 912). For example, the system 100 can automatically and safely transfer a sample to the sample module 104, as described with reference to FIGS. 6A through 6E. Personnel or automated systems can scan the sample module identifier 316 to update the status of the particular sample module 104 to a filled status with the system 908. Method 900 also includes receiving the sample module at the sample transfer station 106 (block 914). For example, personnel or automated systems can transport the sample module 104 having the sample safely contained therein to a laboratory or other location (e.g., second location 114) to facilitate removal of the sample from the sample module 104. Method 900 also includes updating the status of the sample module 104 with the system 908 (block 916). For example, personnel or automated systems can scan the sample module identifier 316 to update the status of the particular sample module 104 to a received status with the system 908.

Method 900 also includes transferring the sample from the sample module 104 to a sample container (block 918). For example, the system 100 can automatically and safely transfer the sample held in the sample loop 302 of the sample module 104 to a bottle 108 or other container via the sample transfer station 106, as described with reference to FIGS. 8A through 8E. The status of the particular sample module 104 can be transmitted to the system 908 to indicate a transferred or transferring status associated with the sample module identifier 316. Method 900 also includes cleaning the sample module 104 (block 920). For example, the sample transfer station 106 or other device can introduce rinse fluids, purge gases, or the like to the sample module 104 and the sample loop 302 contained therein to remove any residual fluids. The status of the particular sample module 104 can be transmitted to the system 908 to indicate a cleaned or cleaning status associated with the sample module identifier 316. Following cleaning, the sample module 104 sample gathering and transfer is complete (block 922), where the completed status can be transmitted to the system 908. The sample module 104 can then be stored (e.g., at the storage unit 902) for later availability for sample collection, with the particular storage unit location associated with the sample module 104 in the system 908.

Figure 10:
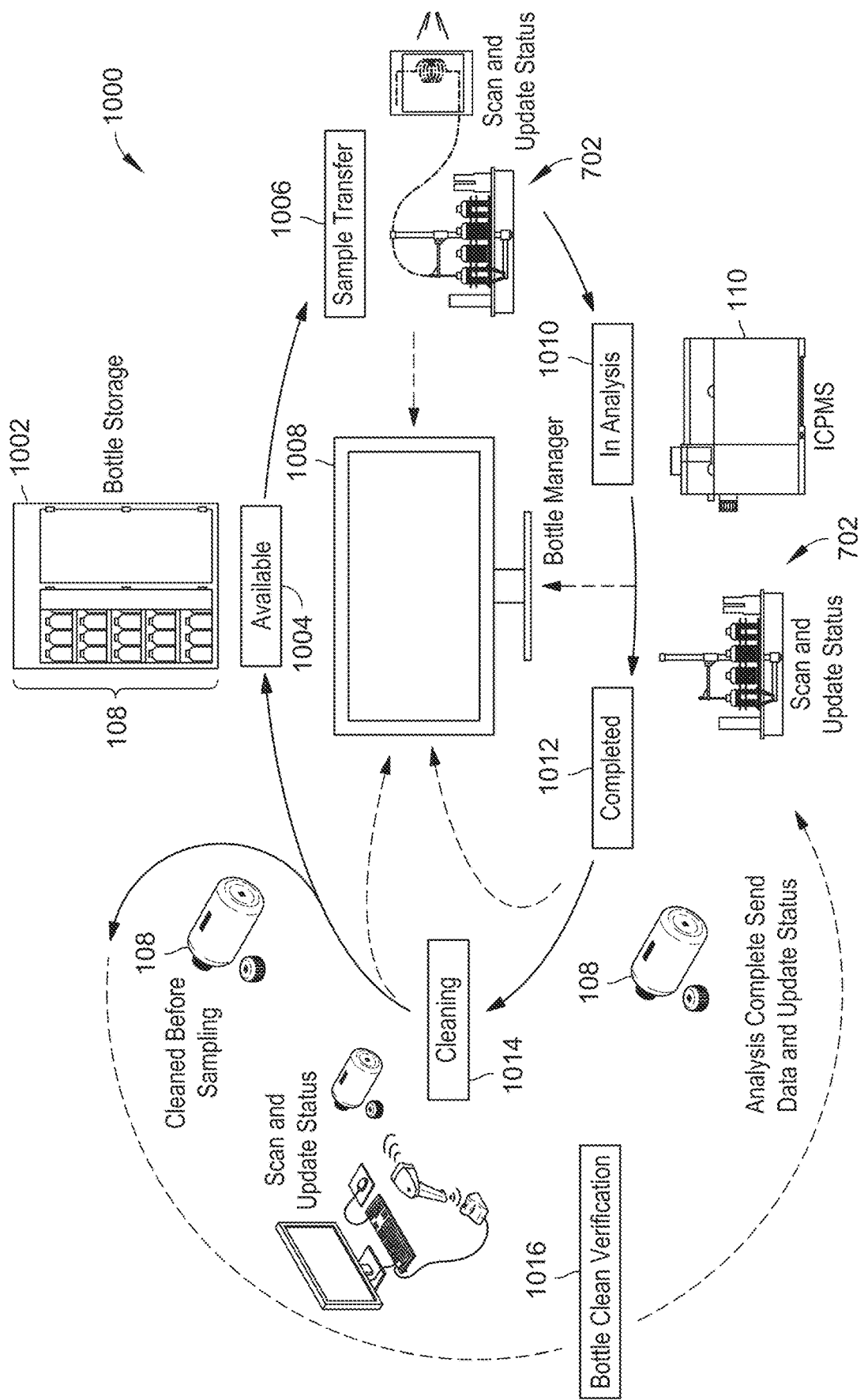
FIG. 10 is a flow diagram for tracking status of a sample bottle in accordance with example implementations of the present disclosure.

The status of individual sample bottles 108 or other containers can be tracked by the system 100. For example, FIG. 10 illustrates an example method 1000 of tracking the status of a particular bottle 108 with the system 100. Method 1000 includes storing a bottle 108 to be available for use at a sample transfer station 106 (block 1004). For example, multiple sample modules 104 can be stored at storage units 1002 in clean and rinsed states. The system 100 logs the status associated with the particular bottle identifier 116 as being stored at the storage unit 1002. For example, the status information can be sent to a centralized system 1008 having databases that track the status of the bottles 108 utilized throughout the system 100. In implementations, the system 1008 or the system 908 can facilitate tracking of the status of each of the bottles 108 and the sample modules 104. The storage unit 1002 can include its own identifier if multiple storage units 1002 are utilized within a facility to uniquely identify one storage unit 1002 from another. Personnel can transfer the bottle 108 from the storage unit 1002 to the sample transfer station 106 to prepare to receive a sample into the bottle from a sample module 104. Method 1000 also includes transferring a sample into the bottle 108 (block 1006). For example, the sample transfer station 106 can receive the sample module 104 and transfer the sample held in the sample coil 302 to the bottle 108 via the autosampler 702, as described with reference to FIGS. 8A through 8E. The autosampler 702 can automatically scan the bottle identifier 116 and transmit updated status information (e.g., transfer in progress, transfer complete, etc.) to the system 1008 for association with the bottle identifier 116.

Method 1000 also includes analyzing the sample from the bottle 108 and updating the status of the bottle 108 (block 1010). For example, the bottle 108 can be transferred to analytic instrumentation 110 for analysis of the composition of the sample held within the bottle 108. The autosampler 702 can automatically scan the bottle identifier 116 and transmit updated status information (e.g., analysis in progress, analysis complete, etc.) to the system 1008 for association with the bottle identifier 116. Analytical data associated with analysis of the sample can also be associated with the bottle identifier 116 in the system 1008 when the analysis is complete (block 1012). Method 1000 also include cleaning the bottle 108 (block 1014). For example, rinse fluids and/or purge gases can be introduced to the bottle 108 to remove any residual fluids following analysis. The status of the particular bottle 108 can be transmitted to the system 1008 to indicate a cleaned or cleaning status associated with the bottle identifier 116. Following cleaning, the bottle 108 can be stored in the storage unit 1002 for later use or can undergo a cleanliness verification procedure to ensure that the bottle 108 is suitable to receive another sample without contaminants present in the bottle 108. For example, method 1000 can include a bottle cleanliness verification (block 1016) where UPW or other fluid is introduced to the bottle 108 and tested at analytic instrumentation 110 to determine whether contaminants are present following the cleaning process. Data from the bottle cleanliness verification can be transmitted to the system 1008 to be associated with the bottle identifier 116.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system, comprising:
a sample module including an enclosure containing a sample loop therein to isolate the sample loop from an exterior environment of the sample module, the enclosure defining a fluid inlet and a fluid outlet, the sample module further including a valve having at least a first flow path configuration and a second flow path configuration, the valve coupled between the fluid inlet and the fluid outlet defined by the enclosure; and
a filling station configured to couple with at least a portion of the enclosure of the sample module, the filling station including at least one fluid outlet configured to fluidically couple with the fluid inlet of the sample module when the sample module is coupled with the filling station and including at least one fluid inlet configured to fluidically couple with the fluid outlet of the sample module when the sample module is coupled with the filling station,
wherein the valve fluidically couples the sample loop with the fluid inlet of the sample module and with the fluid outlet of the sample module when the valve is in the second flow path configuration and the valve provides a flow path between the fluid inlet of the sample module and the fluid outlet of the sample module that bypasses the sample loop when the valve is in the first flow path configuration.

2. The system of claim 1, wherein the filling station includes a compartment sized and dimensioned to receive at least a portion of the sample module enclosure within the compartment.

3. The system of claim 1, wherein the filling station includes a plurality of fluid outlets, and wherein each fluid outlet of the plurality of fluid outlets is fluidically coupled with the fluid inlet of the sample module when the sample module is coupled with the filling station.

4. The system of claim 3, wherein the plurality of fluid outlets includes a first outlet configured to supply a rinse fluid to the fluid inlet of the sample module, a second outlet configured to supply a purge gas to the fluid inlet of the sample module, and a third outlet configured to supply a chemical sample to the fluid inlet of the sample module.

5. The system of claim 1, further comprising:
a transfer station configured to couple with at least a portion of the enclosure of the sample module when the sample module is decoupled from the filling station, the transfer station including at least one autosampler configured to transfer fluid from the sample module to a sample container.

6. The system of claim 5, wherein the transfer station includes a transfer line fluidically coupled between the fluid outlet of the sample module and the at least one autosampler.

7. The system of claim 6, wherein the valve fluidically couples the sample loop with the transfer line when the valve is in the second flow path configuration and coupled with the transfer station and the valve provides a flow path between the fluid inlet of the sample module and the transfer line that bypasses the sample loop when the valve is in the first flow path configuration and coupled with the transfer station.

8. The system of claim 5, wherein the transfer station includes at least a first fluid outlet and a second fluid outlet, each of the first fluid outlet and the second fluid outlet fluidically configured to fluidically couple with the fluid inlet of the sample module when the sample module is coupled with the transfer station.

9. The system of claim 1, wherein the sample module includes a sample module identifier positioned on the enclosure.

10. The system of claim 9, wherein the sample module identifier includes at least one of a barcode, a data matrix two-dimensional barcode, or an RFID tag.

11. The system of claim 9, wherein the filling station includes a filling station identifier positioned on a surface of the filling station.

12. The system of claim 1, wherein the filling station identifier includes at least one of a barcode, a data matrix two-dimensional barcode, or an RFID tag.

13. A method for contained collection and transfer of a chemical sample, comprising:
coupling a sample module with a filling station at a first location, the sample module including an enclosure containing a sample loop therein to isolate the sample loop from an exterior environment of the sample module, the enclosure defining a fluid inlet and a fluid outlet, the sample module further including a valve having at least a first flow path configuration and a second flow path configuration, the valve coupled between the fluid inlet and the fluid outlet defined by the enclosure;
introducing a fluid to the sample module while bypassing the sample loop while the valve is in the first flow path configuration;
transferring a chemical sample from the filling station to the sample loop while the valve is in the second flow path configuration;
isolating the chemical sample within the sample loop;
decoupling the sample module from the filling station; and
transferring the sample module to a second location.

14. The method of claim 13, wherein introducing a fluid to the sample module while bypassing the sample loop while the valve is in the first flow path configuration includes:
introducing a first fluid to the fluid inlet of the sample module while the valve is in the first flow path configuration; and
subsequent to introducing the first fluid, introducing a second fluid to the fluid inlet of the sample module while the valve is in the first flow path configuration.

15. The method of claim 14, wherein the first fluid is a rinse fluid, and wherein the second fluid is a purge gas.
transferring the sample module to a transfer station, the transfer station including at least one autosampler configured to transfer fluid from the sample module to a sample container.

16. The method of claim 13, further comprising:
coupling the sample module with a transfer station at the second location, wherein the transfer station includes at least one autosampler configured to transfer fluid from the sample module to a sample container.

17. The method of claim 16, further comprising:
transferring the chemical sample from the sample loop to a transfer line of the transfer station through operation of the at least one autosampler.

18. The method of claim 17, further comprising:
transferring the chemical sample from the transfer line into a sample container at the transfer station through operation of the at least one autosampler.

19. The method of claim 13, further comprising:
prior to transferring the sample module to the second location, scanning a sample module identifier positioned on the enclosure of the sample module and a filling station identifier positioned on a surface of the filling station; and associating the chemical sample within the sample loop with each of the sample module identifier and the filling station identifier to identify the chemical sample as originating from the filling station.

20. The method of claim 19, wherein at least one of the sample module identifier and the filling station identifier includes at least one of a barcode, a data matrix two-dimensional barcode, or an RFID tag.

* * * * *